March 9, 1937. A. J. BARNEBL 2,073,384
FILTER
Filed May 13, 1932
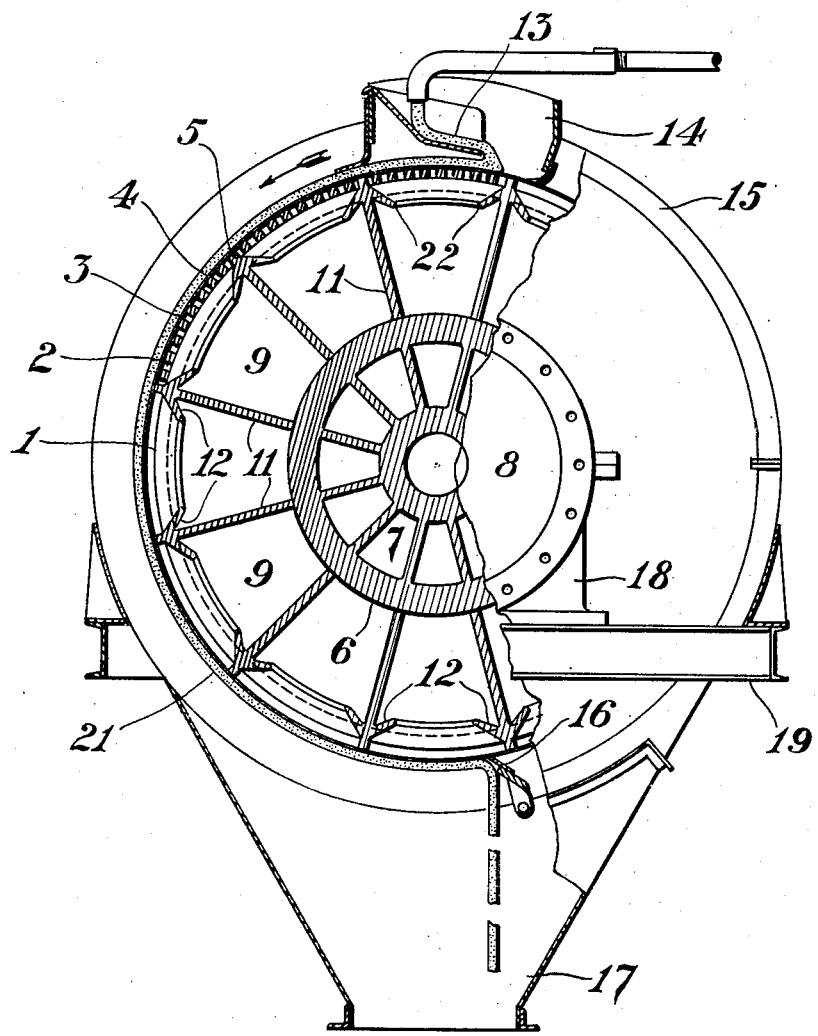
INVENTOR
August. J. Barnebl
BY
ATTORNEY Patented Mar. 9, 1937

2,073,384

UNITED STATES PATENT OFFICE 2,073,384

FILTER

August J. Barnebl, Chicago, Ill., assignor, by mesne assignments, to Oliver United Filters Incorporated, San Francisco, Calif., a corporation of Nevada Application May 13, 1932, Serial No. 611,108

10 Claims. (Cl. 210—201)

This invention relates to continuous filters and particularly to continuous rotary drum filters wherein the outer surface of the drum is divided into shallow independent sections or compartments connected by means of suitable filtrate passages to an automatic distributing valve associated with one end of the drum trunnion. As is well known to the trade the cycle of operation of a continuous filter consists of cake formation, drying and discharging and the entire cycle is controlled by means of the automatic valve. In some types of filters the rotary drum rotates within a pan or tank containing the pulp or feed to be filtered and in this type of filter each section or compartment successively picks up a layer of cake during its progression through the pulp. The cake so formed is then washed by means of suitable sprays, dried by passing air, either cold or hot, through the cake and then finally discharged by means of a scraper aided by a blowback or other well known discharging mechanism. In other forms of rotary drum filters known as "top feed" or "tankless" filters, the pulp is fed to the upper surface of the drum by means of some suitably arranged hopper. The remainder of the cycle of operation is effected in much the same manner as above described. In many instances the ultimate objective of filtration is to obtain a substantially bone dry cake. To effectively accomplish this, it has been found necessary to pass very large volumes of air through the cake and as a result large unrestricted passages connecting each of the filter compartments with the filter valve are required.

I have found that an appreciable quantity of filtrate or moisture adheres to the inner surfaces of these passages and that under some conditions this liquid if given an opportunity will drain back to the dried cake before it is discharged from the drum, thereby defeating or at least impairing the desired results. Where hot air is used to dry the cake, the moisture entrained by the air condenses on the inner surfaces of the filtrate passageways which are at a somewhat lower temperature than the air passing through them and this condensation adds to the moisture content adhering to the filtrate pasages.

In general it is the object of my invention to provide means intermediate the compartments and automatic valve of a continuous filter whereby the drainage of filtrate from the filtrate passages to the cake supported on the drum surface is prevented.

More specifically the object of my invention is the provision of drainage gutters or traps within the filtrate passages of a rotary drum filter to thereby prevent the drainage of filtrate to the filter cake.

The invention possesses other advantageous features, some of which with the foregoing, will be set forth at length in the following description where I shall outline in full that form of my invention which I have selected for illustration in the drawing accompanying and forming part of the present specification. In said drawing, I have shown one form of my invention, but it is to be understood that I do not limit myself to such form, since the invention as set forth in the claims, may be embodied in a plurality of forms.

Referring to the drawing:

The single figure shown in the drawing is a side elevation, partly in section, of a top feed or tankless filter, the filtrate passage of which are provided with drainage gutters.

As shown the filter comprises a drum 1, to the outer face of which are secured sectionalized drainage screens or members 2. The outer cylindrical surface formed by the drainage screens 2 is covered with a suitable filter medium 3 and the annular cylindrical drainage space defined by the drum 1 and the filter medium 3 is divided into compartments 4 by means of division strips 5.

The drum 1 is mounted on trunnions 6 located at each end of the drum and one of these trunnions carries a valve seat provided with valve ports 7 adapted to register with corresponding ports provided in a valve chamber 8. Filtrate passages 9, formed by walls 11, establish communication between the filter compartments 4 and the valve ports 7 carried by the trunnion 6.

Surrounding the entire inner surface of each filtrate passage 9 is a drainage trap or gutter 12 which preferably should be secured as closely as possible to the filter compartments 4. As shown in the drawing the division strips 5, the walls 11 of the filtrate passages 9, and the drainage gutters 12 are made of a single casting, but it is to be understood that each of these elements may be made as individual units and assembled in any well known manner.

The pulp 13 to be filtered is fed to the top of the drum by means of a hopper 14 secured to a hood 15 which encloses the entire structure and the dried cake is discharged by means of a scraper 16 (aided by the usual blowback) through a chute 17 onto any suitable conveyor (not shown).

The trunnions 6 are journaled in suitable bearings 18 and the entire structure may be supported upon a frame 19.

As above stated the pulp or feed to be filtered is fed to the upper surface of the drum by means of a hopper 14 and forms a layer of cake 21. Hot or cold air is introduced into the hood 15 and is pulled through the cake by means of the usual vacuum applied through the valve ports 7. As the leading edge of each successive compartment 4 and filtrate passage 9 passes beneath the horizontal position, the filtrate adhering to the walls 11 drains in an outward direction towards the filter cake, but is prevented from reaching it by the gutter or trap 12. The passage of air through the filtrate passages 9 should be unrestricted and consequently the lips 22 of the drainage gutters 12 should not extend outwardly any more than absolutely necessary. The capacity of the gutters should, however, be sufficient to accommodate the maximum amount of filtrate which is likely to drain back under any given operating conditions and consequently there should be a definite correlation between the capacity of the gutters and this maximum amount of drainage filtrate.

As shown in the drawing the cake is discharged as each filter compartment reaches its lowermost position but in some cases the drying cycle is continued until each compartment has passed upwardly to the horizontal position.

Although a top feed filter has been illustrated, my invention is also applicable to filters rotating within a pulp tank, for oftentimes this latter type of filter is not discharged until each compartment has passed the horizontal position.

I claim:

1. In a rotary drum filter having the usual filter sections, filter valve and filtrate passages between said sections and valve, inwardly directed drainage traps formed intermediate said sections and valve.

2. In a rotary drum filter having the usual filter sections, filter valve and filtrate passages between said sections and valve, inwardly directed drainage traps disposed in said filtrate passages.

3. In a rotary drum filter having the usual filter sections, filter valve and filtrate passages between said sections and valve, endless inwardly directed drainage traps disposed in said filtrate passages.

4. In a rotary drum filter having the usual filter sections, filter valve and filtrate passages between said sections and valve, inwardly directed drainage traps disposed in said filtrate passages; the capacity of said traps being so correlated to the quantity of filtrate adhering to the walls of the passages as to accommodate substantially all of said filtrate.

5. In a rotary drum filter having the usual filter sections, filter valve and filtrate passages between said sections and valve, inwardly directed drainage traps disposed in said passages adjacent said sections.

6. In a vacuum extractor, a rotary drum, radial walls dividing said drum into a plurality of radially disposed compartments extending lengthwise thereof, means providing extractor cells extending about the periphery of said drum, said means including nozzles severally depending into said compartments and directed at an angle to said radial walls, said nozzles having side walls running the length of the drum and providing pockets adjacent to said radial walls of the drum.

7. In a vacuum extractor, a rotary drum, radial walls dividing said drum into a plurality of radially disposed compartments extending lengthwise thereof, means providing extractor cells extending about the periphery of said drum, said means including nozzles severally depending into said compartments and running lengthwise of the drum, said nozzles being directed at an angle to said radial walls and having side and end walls providing intercommunicating pockets about each nozzle adapted to receive liquid entrained on said radial walls.

8. In a vacuum extractor, a rotary drum, walls extending lengthwise of said drum dividing it into a plurality of compartments, means providing extractor cells extending about the periphery of said drum, said means including nozzles severally depending into said compartments, said nozzles having walls providing pockets in the angles of said walls with the periphery of said drum.

9. In a rotary drum filter, a plurality of filter sections, filtrate passages communicating with said sections and inwardly directed filtrate drainage traps depending into said filtrate passages.

10. A filter comprising a rotary drum, division strips dividing said drum into a plurality of filter sections, filtrate passages communicating with said filter sections and inwardly directed filtrate drainage gutters formed about and depending from said filtrate passages.

AUGUST J. BARNEBL.